Figure 1:
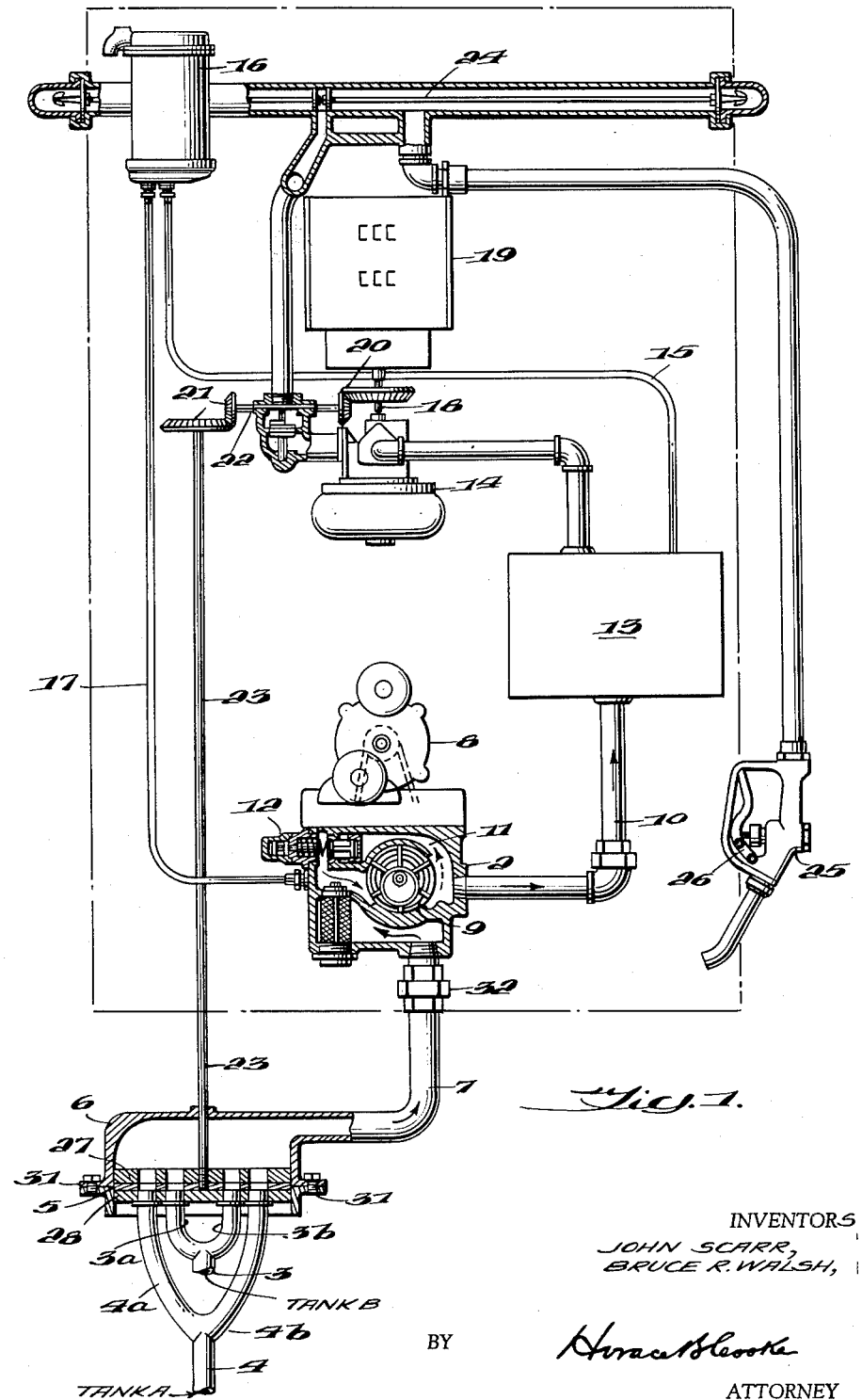

May 16, 1961 J. SCARR ET AL 2,984,388
METER CONTROLLED PROPORTIONING VALVE
Filed Sept. 18, 1958 3 Sheets-Sheet 1

INVENTORS
JOHN SCARR,
BRUCE R. WALSH,
BY Horace B Cooke
ATTORNEY

May 16, 1961 J. SCARR ET AL 2,984,388
METER CONTROLLED PROPORTIONING VALVE
Filed Sept. 18, 1958 3 Sheets-Sheet 2

INVENTORS
JOHN SCARR,
BRUCE R. WALSH,

BY Horace B. Cooke

ATTORNEY

United States Patent Office 2,984,388
Patented May 16, 1961

2,984,388

METER CONTROLLER PROPORTIONING VALVE

John Scarr, Verona, and Bruce R. Walsh, Pittsburgh, Pa., assignors to Gulf Research & Development Company, Pittsburgh, Pa., a corporation of Delaware Filed Sept. 18, 1958, Ser. No. 761,745

7 Claims. (Cl. 222—71)

This invention relates to a fluid proportioning system and more particularly to a gasoline dispensing system adapted to blend and dispense a plurality of gasoline stocks in varying proportions.

The growing trend in the automobile industry toward higher horsepower necessitates a boost in compression ratios of auto engines which in turn requires a higher octane rated gasoline to counteract the greater knocking tendency of the higher compression ratio engine. This continuing increase in compression ratios of auto engines with attendant higher octane number rating to match has created a wide divergency between the octane rating requirements of the earlier model automobiles as compared with the new models. Heretofore most gasoline service stations have offered only two grades of gasoline for sale, each grade having a relatively different octane number rating, that is, one grade possessing an octane rating sufficient, ordinarily, to prevent knocking in automobile engines that exhibit the most extreme knocking tendencies and a second quality gasoline adapted to function without knocking in automobile engines having substantially less knocking tendencies. By far the greatest number of autos today have octane requirements which lie between the two grades normally marketed; however, to avoid knocking in these auto engines the motorist is forced to purchase a gasoline of considerably higher octane rating than the minimum required. In order to alleviate this situation gasoline can be marketed intermediate in quality between the two grades normally marketed. These intermediate grades of gasoline can be marketed by installing additional storage and pumping facilities in existing service stations, bulk plants and refineries, but a considerable saving is effected by utilizing the existing dual storage facilities and by marketing blends of the present higher and lower octane gasolines blended at the service station at the time of purchase.

Various gasoline proportioning and dispensing pumps have been proposed as a solution to the blending of gasolines at the service station, but such pumps are normally relatively expensive since they usually involve several duplicate parts, and in that they are sufficiently unconventional as to present substantial problems of manufacture and supply. Adjustable proportioning valve devices have also been proposed to accomplish blending of gasoline at the service station, but difficulty is usually encountered in such systems in maintaining a constant proportion of component gasolines in the blend. This is due to an independent variation in pressure differential across the respective proportioning valves that results primarily from independent variation in the respective tank levels. In accordance with the present invention a relatively low cost, blending, proportioning and dispensing system is provided that is adapted for use with the standard gasoline dispensing systems currently used and offered to the trade without substantial alteration or redesign of such systems. Broadly, the present invention includes a main supply conduit, a plurality of branch supply conduits connected to the main supply conduit and to separate sources of supply.

The invention also includes a proportioning means which comprises a rotating plate valve associated with each of the branch supply conduits in the direction of the main supply conduit that maintains a constant proportion of component gasolines in the blend irrespective of independent variation in the respective tank levels. A positive displacement dispensing pump is connected on its suction side to the main supply and blending conduit and to the dispensing conduit on the discharge side. Bypass means are provided for recirculating the pumped fluid in excess of the amount that can be discharged from the dispensing pump into the dispensing conduit, said fluid being bypassed from the discharge side of the pump to its suction side. A substantially constant speed motor is provided for driving the positive displacement pump. The invention further includes a hydraulic motor operatively associated with the dispensing conduit and means associated with the said hydraulic motor operatively associated with the dispensing conduit and means associated with the said hydraulic motor and adapted to drive the proportioning means in such a manner that a total of one volume of fluid is caused to flow through the proportioning valve for each volume of fluid passed through the hydraulic motor. The invention also includes a valve in the dispensing conduit adapted to control fluid flow therethrough.

Referring to the drawings there is shown in Figure 1 a schematic diagram partly in section of a gasoline proportioning and dispensing system embodying the principles of this invention.

Figure 2:
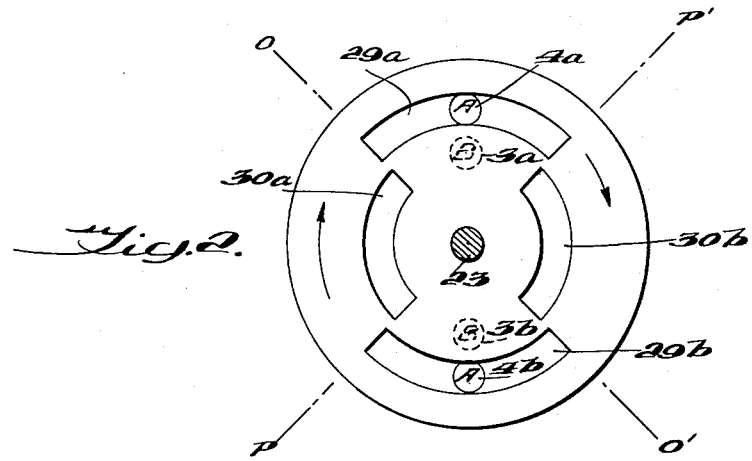

Figure 2 illustrates a top view of a rotatable plate valve suitable for use in the combination of Figure 1.

Figure 3:
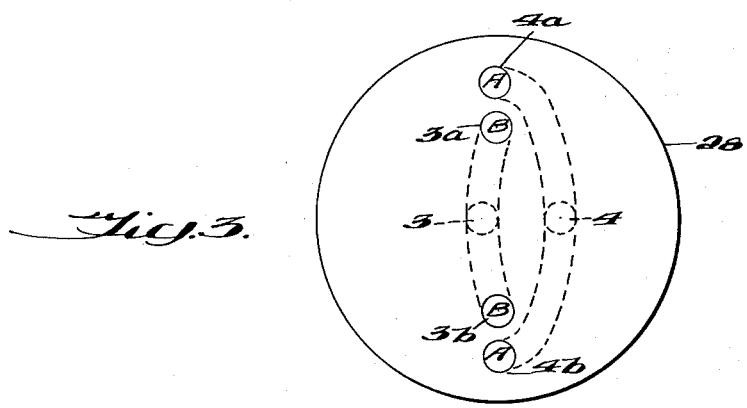
Figure 4:
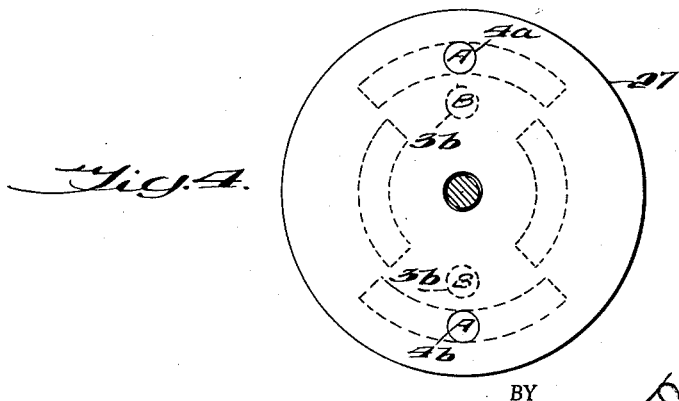

Figures 3 and 4 comprise, respectively, top views of a lower stationary plate and an upper stationary plate to be used in combination with the rotatable plate valve of Figure 2.

Figure 5:
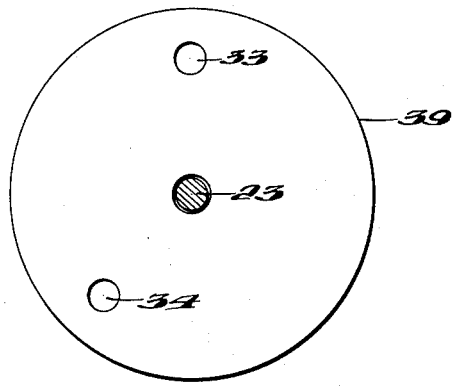
Figure 6:
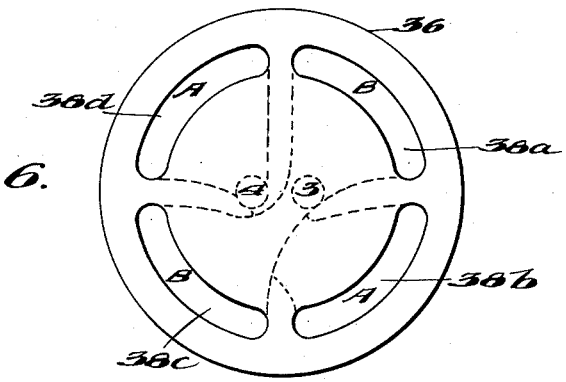
Figure 7:
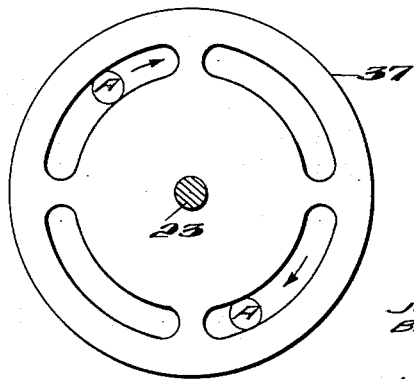

Figures 5, 6 and 7 comprise, respectively, top views of another rotatable plate valve, lower stationary plate and upper stationary plate which may be used in the combination of Figure 1.

Referring now to Figure 1 in greater detail, operation of a rotary type displacement pump 2 causes reduction in pressure on the inlet or suction side of the pump. Atmospheric pressure acting on the gasolines in tanks A and B (indicated by legends in Fig. 1) causes flow of these gasolines from the tanks through supply conduits 3 and 4, and their branch conduits 3a, 3b, 4a and 4b, respectively, toward rotating valve 5 in the proportioning device 6. As will be described in more detail hereinafter, rotating valve 5 opens and closes off supply conduits 3a, 3b, 4a and 4b in such a manner that the equivalent flow of two branch conduits is always open to the flow of fluid. The gasolines from tanks A and B are caused to flow toward pump 2 in a fixed proportion, the proportion being dependent upon the intervals in which the respective conduits 3a and 3b or 4a and 4b remain open in proportioning device 6. The final blended fluid proportion depends upon the relative time that the rotating valve remains open to the flow of each of the two respective gasoline stocks. This relative time depends only upon the length of the arcuate slots in valve 5 which alternately and/or simultaneously connect with inlets from sources A and B. The gasolines from tanks A and B are blended at the discharge side of the proportioning device 6, and the mixture then passes into a main supply conduit 7 toward the suction side of dispensing pump 2 to which conduit 7 is connected. Pump 2 is driven at an essentially constant speed by electric motor 8. The blended gasoline is conveyed from the suction side of pump 2 by rotation of vaned rotor 9 (geared or other pumping members) into the discharge side of the pump, and then into dispensing conduit 10.

Dispensing pump 2 has a capacity such that it will pump gasoline at least as rapidly as, and usually more rapidly than, the maximum rate at which it is dispensed from the system. The volume of gasoline as it is pumped through the pump in excess of the volume dispensed from the system is recirculated through bypass conduit 11 and through spring-loaded, pressure relief valve 12 back to the suction side of pump rotor 9.

Connected in series in dispensing conduit 10 is an air eliminator 13 to facilitate separation of air bubbles from the blended gasoline before it is passed through meter 14, which is also connected in series in dispensing conduit 10 downstream of the air eliminator. Air bubbles from the gasoline in air eliminator 13 are passed with some gasoline through a small diameter conduit 15 into chamber 16 from which the air is vented to the atmosphere. The level of gasoline which is trapped in chamber 16 is controlled by a float valve (not shown). Excess gasoline in chamber 16 recirculates to the inlet side of dispensing pump 2 by small diameter conduit 17.

The volume of gasoline passed through dispensing conduit 10 is measured by flow through meter 14 which is, in essence, a hydraulic motor having a rotary shaft 18. The rotation of shaft 18 is directly proportional to the volume of liquid passed through the said meter. Rotation of shaft 18 is translated into total gallons and total sales price by a system of gears in variator and computer-counter 19.

The rotation of shaft 18 also drives rotating valve 5 of proportioning device 6 through pairs of beveled gears 20 and 21 connected with drive shafts 22 and 23, respectively. Rotatable valve 5 is sandwiched between stationary plates 27 and 28 which are rigidly connected, circumferentially, with the housing of proportioning device 6. The inlet ports in lower plate 28 are connected by welding or other appropriate means to inlet pipes 3a, 3b, 4a and 4b. Discharge ports in upper plate 27 are in axial alignment with the inlet ports in plate 28 and are identical in shape and spacing to the latter. The proportioning device will operate without upper plate 27 as the two liquids will commingle at this point; however, plate 27 will prevent warpage of valve 5 due to temperature changes, etc. Discharge from the ports in the said upper plate flows into the main supply conduit 7.

Rotatable valve 5 is designed in such a manner that during operation the equivalent volume flow of two open inlets will flow through proportioning device 6 at all times from tanks A and/or B. The rotation of valve 5 of proportioning device 6 and the rotation of meter shaft 18 are so interrelated that for each unit volume of gasoline that is caused to flow through meter 14, a total of one unit volume of gasoline will be caused to flow from branch supply conduits 3a, 3b, 4a 4b through proportioning device 6 to the main supply conduit 7.

Continuing with a detailed discussion of the system as shown in Figure 1, the blended gasoline passes downstream from meter 14 through a check valve, not numbered, through visi-gauge 24 and out of the system from dispensing nozzle 25 at a rate controlled by manually operated spring-loaded dispensing valve 26.

For a clearer understanding of proportional device 6, reference is now made to Figures 2, 3 and 4 in which are shown top views of rotating valve 5, and stationary plates 27 and 38. In these figures like parts have been designated by the same numerals.

Rotating valve 5 is threadedly mounted, centrally, on shaft 23, and sandwiched between stationary plates 27 and 28. Valve 5 is provided with diametrically opposed arcuate slots 29a, 29b, and 30a, 30b which are concentrically arranged around the central axis, slots 30a and 30b also being concentrically arranged with respect to slots 29a and 29b. The terminating axis O—O' of arcuate slots 30a and 30b are circumferentially spaced substantially 90° (angles greater or lesser than 90° determine the blend) from the terminating axis P—P' of slots 29a and 29b, as based on clockwise observation of the non-moving plate 5. Ports communicative with conduits 3a and 3b in stationary plate 28 are arranged in such manner as to provide flow through arcuate slots 30a and 30b, respectively, in valve 5; likewise, fluid flowing through ports communicative with conduits 4a and 4b will flow through slots 29a and 29b, respectively, in valve 5. Inlet ports communicative with conduits 3a and 4a are spaced substantially 180° angularly with respect to inlet ports communicative with conduits 3b and 4b in plate 28.

Referring to Figure 2 in particular, it may be seen that as valve 5 rotates, the equivalent volume flow of two fully open ports will pass at all times through the said valve to the discharge side of the proportioning device. As illustrated, valve 5 will deliver fluid from tank A through slots 29a and 29b and fluid from tank B through slots 30a and 30b. The amount of fluid flowing from tanks A or B through valve 5 to the discharge side of proportioning device 6 is dependent upon the length of the arcuate slots in valve 5 which open the said branch supply conduits to flow. Since the end of each arcuate slot lies on the same radial axis as the end of the adjacent concentrically located slot, it may be seen that at some point of rotation of valve 5, fluid will flow simultaneously from all ports through the said valve; however, the volume of fluid flowing through these simultaneously flowing ports will neither exceed nor be less than that volume of fluid which would flow through two fully open ports. For example, if the valve, as illustrated in Figure 2, were to be rotated clockwise approximately 45°, fluid would flow simultaneously through valve 5 from all inlet ports in plate 28, but only one-half of each inlet port would be open to flow, thus providing the equivalent volume flow of two fully opened ports.

The housing of proportioning device 6 is preferably constructed in two sections, joined at some point between upper plate 27 and lower plate 28 in such a manner that the two halves may be easily separated. In the illustrated embodiment the two halves of the said housing are joined by a bolted flange 31.

The proportions of fluids to be blended may be changed by use of rotating plates which have arcuate slots designed to admit different proportions of the fluids to be blended. The plates are simply changed by disengaging the device from the main conduit, separating the upper half from the lower half of the said housing and substituting a different plate for the one threadedly engaged with shaft 23, thereafter rejoining the two halves of the housing and recoupling the proportioning device with the main conduit.

In the illustrated embodiment of Figure 1 the means associated with meter 14 and adapted to drive rotating valve 5 of proportioning device 6 is shown as gears 20 and 21 engaged with shafts 22 and 23 respectively; however, the invention is not limited to such structure. Any other suitable means for transmitting the rotary motion of shaft 18, either directly or indirectly, to the plate valve 5 of proportioning device 6 can be used. For example, where the proportioning device 6 is relatively remote from meter 14, it is advantageous that the rotary motion be transmitted over most of the distance between the meter and the proportioning device by means of a pair of self-synchronous, or so-called "Selsyn," electric motors, or equivalent means. Such motors can be interposed in place of shafts 22 and 23.

Instead of the valve of proportioning device 6 as shown in Figures 1–4, other valves capable of performing the same function can be used, for example, the device shown in Figures 5, 6 and 7. Figure 5 is a top view of a rotating valve 39 which contains two ports 33 and 34 offset from 180° angularly in relation to each other. Figures 6 and 7 illustrate top views of a lower stationary plate 36 and an upper stationary plate 37, respectively. In lower plate 36 there are four arcuate slots 38a, 38b, 38c and 38d, circumferentially arranged around the central axis, which serve as inlet ports for fluid flowing from conduits 3 and 4. It may be seen that as valve 39 rotates, arcuate ports in lower stationary plate 36 will be alternately opened and closed admitting fluids blended in a proportion determined by the length of the arcuate slots in said lower plate.

It will be appreciated that placing of the proportioning valve upstream of the dispensing pump is advantageous in that such placement permits use of standard gasoline dispensing pumps as blending pumps without substantial redesign. It will also be noted that the herein disclosed invention permits passage of the blended product to the dispensing pump, thereby avoiding the use of two pumping systems attendant to placing the proportioning valve downstream of the dispensing pump. The herein disclosed invention also permits pumping of the two liquids in varying proportions, using both a single dispensing pump and a single flow meter. By the use of the herein described proportioning system changes in fluid blend proportions caused by independent variation in the respective tank levels is effectively minimized and the maintenance of two ports fully open at all times avoids pump cavitation.

It will be apparent that two or more fluids, other than gasoline, can be blended in a fixed, predetermined proportion using the herein described invention. In addition, various changes in form, size, arrangement of parts, operation and mechanical details may be made. It is therefore obvious that these and other modifications can be resorted to without departing from the spirit and scope of the invention. Accordingly only such limitations should be imposed as are specifically set forth in the appended claims.

We claim:

1. In a metered gasoline dispensing system having a proportioning valve means operatively connected to a meter driving means, said valve means being connected to the dispensing conduit and to a plurality of fluid sources, and comprising a stationary plate having a plurality of fluid inlet ports connected to said plurality of fluid sources, a movable plate valve in contact with the stationary plate and adapted to be rotatably driven by said meter driving means, said movable plate valve having concentrically arranged ports therein so located and arranged so that as the movable plate valve is rotated, the ports will align with ports of the stationary plate, thereby causing fluid to flow from a plurality of fluid sources in a definite proportion.

2. In a metered gasoline dispensing system having a meter driving means, a proportioning device operatively associated with said meter driving means and connected downstream of and to a positive displacement dispensing pump and to a plurality of fluid sources, the improvement comprising a housing, a stationary plate secured circumferentially within said housing, said stationary plate having a plurality of fluid inlet ports respectively connected to the said plurality of fluid sources, a rotatable plate valve in contact with said stationary plate, said rotatable plate valve having concentrically arranged arcuate slots therein so located and arranged as to open the ports in the said stationary plate to flow from the said plurality of fluid sources in a definite proportion, and means connecting said meter driving means to said plate valve for rotating the same.

3. In a metered gasoline dispensing system having a proportioning device operatively connected to a meter driving means and connected downstream of and to a positive displacement dispensing pump and to a plurality of fluid sources, the improvement comprising a housing, a stationary plate secured circumferentially within said housing, said stationary plate having a plurality of fluid inlet ports respectively connected to the said plurality of fluid sources, a rotatable plate valve in contact with said stationary plate, a means for rotatingly driving said rotatable plate valve by said meter driving means, said rotatable plate valve having concentrically arranged arcuate slots therein so located as to open the ports in the said stationary plate to flow from the plurality of fluid sources in a definite proportion whereby the length of each arcuate slot determines the relative time the rotatable plate valve remains open to the flow of each gasoline stock from its source of supply.

4. In a metered gasoline dispensing system having a dispensing conduit, a hydraulic motor constituting a meter driving means in said dispensing conduit, a proportioning valve connected to the dispensing conduit and to a plurality of fluid sources, adapted to be driven by the hydraulic motor, and having a positive displacement dispensing pump in the dispensing conduit upstream of the said hydraulic motor and downstream of the proportioning valve, the improvement comprising a housing, a stationary plate secured circumferentially within said housing, said stationary plate having a plurality of fluid inlet ports connected to the plurality of fluid sources, a plate rotatably mounted on the stationary plate, the rotatable plate having concentrically arranged ports therein, being substantially in the form of arcuate slots, the ends of each slot lying on the same radial axes as the ends of the adjacent slot concentric thereto, there being two diametrically opposed slots provided in said rotatable valve to open the ports in the stationary plate to the flow of each fluid to be blended, a means connected to the hydraulic motor and adapted to rotatingly drive the rotatable plate valve whereby for each volume of fluid caused to flow through the hydraulic motor an equal volume of fluid will pass through the proportioning valve.

5. A fluid proportioning device comprising a housing, a lower stationary plate secured to said housing and forming therewith a fluid chamber, the stationary plate having a plurality of fluid inlet ports respectively connected to a plurality of fluid sources, an upper stationary plate secured to said housing, said plate having a plurality of ports concentrically arranged around a central axis common to both said stationary plates, a rotatable plate valve interposed between the stationary plates and having a plurality of ports concentrically arranged around the central axis, these ports being substantially in the form of arcuate slots, the end of each slot lying on the same radial axis as the end of the adjacent slot concentric thereto, the ports lying on each concentric arc being so located and arranged as to open the ports in the said stationary plate to the flow of a definite fluid to be blended, and a means for continuously rotating said plate valve relative to the ports in said stationary plate.

6. A fluid proportioning device comprising a housing, a stationary plate secured circumferentially to said housing and forming therewith a fluid chamber, the stationary plate having a plurality of fluid inlet ports respectively connected to a plurality of fluid sources, a rotatable plate valve in contact with the stationary plate having ports concentrically arranged around the central axis, there being two diametrically opposed ports provided therein to open the ports in the stationary plate to the flow of each fluid to be blended in a definite proportion, the radial axes of any two diametrically opposed ports being spaced substantially 90° angularly and concentrically with respect to any other pair of ports and a means for continuously rotating said plate valve relative to the ports in said stationary plate.

7. A fluid proportioning device comprising a housing, a stationary plate secured circumferentially to said housing and forming therewith a fluid chamber, the stationary plate having a plurality of fluid inlet ports respectively connected to a plurality of fluid sources, a rotatable plate valve in contact with the stationary plate, said valve having ports concentrically arranged around the central axis, said ports being substantially in the form of arcuate slots, and the ends of each slot lying on the same radial axes as the end of the adjacent slot concentric thereto, there being two diametrically opposed slots provided in said rotatable valve to open the ports in the stationary plate to the flow of each fluid to be blended whereby the equivalent of two fully opened inlet ports passes through the valve at all times and a drive shaft journaled in said housing and drivingly connected to said rotatable plate valve.

References Cited in the file of this patent

UNITED STATES PATENTS

| | | |
|---|---|---|
| 1,306,210 | Zucker | June 10, 1919 |
| 1,347,997 | Duffy | July 27, 1920 |
| 2,057,226 | Bleecker | Oct. 13, 1936 |